United States Patent Office

3,616,678
Patented Nov. 2, 1971

3,616,678
PROCESS FOR MEASURING OXYGEN
PARTIAL PRESSURE
Peter Batzies, Am Hirschwald, Germany, assignor to
Brown-Boveri & Cie Aktiengesellschaft, Mannheim-
Kafertal, Germany
Filed Sept. 15, 1969, Ser. No. 857,830
Claims priority, application Switzerland, Sept. 16, 1968,
13,882/68
Int. Cl. G01n *27/14;* G01r *5/28*
U.S. Cl. 73—26                                          4 Claims

ABSTRACT OF THE DISCLOSURE

The partial pressure of oxygen in a high vacuum is measured with an emission electrode emitting "heated" electrons and disposed in a heating circuit in electric circuit with a collector electrode. The temperature is kept so high that oxygen alone is adsorbed on the emitter electrode. The system is adaptable for measurements within a chamber or in outer space.

---

This invention relates to a process and a device for measuring the oxygen partial pressure of a high vacuum, especially an ultrahigh vacuum, by means of an emission electrode emitting "heated" electrons and arranged in a heating circuit, and a collector electrode, both arranged in an electric circuit.

Pressures are commonly measured with an ionization vacuum gauge in which the gas molecules are ionized and the ionic current is measured (E. A. Trendelnburg, Ultra-Hochvakuum, publ. G. Braun, Karlsruhe, 1963). The measured ionic current is proportional to the total pressure. Measurement of the partial pressure of oxygen, for example, is not however possible in this way.

It is known (E. A. Trendelnburg, supra) that the ionized gas molecules may be separated from each other with a mass spectrometer, in each instance determining the quotient of charge and mass. The measured ionic currents will then be a measure of the partial pressures. The outlay, however, is very great, and especially not warranted when only the oxygen partial pressure is to be measured.

It is known further (Vakuumtechnik, 10th year, p. 110) that the several gaseous components may be adsorbed on a heated surface. As the temperature of the surface is slowly elevated, each gaseous component will desorb beginning at a definite temperature, with in each instance a brief pressure rise in the vicinity of the surface. From the respective pressure rise, the density of the gaseous component in question is then determined. This method, however, does not lend itself to industrial application, because in the first place it requires much care and practice, and in the second place may readily lead to false conclusions. This method moreover presupposes a finite volume, so that the pressure rise can be measured.

The basis of the invention is to measure the oxygen partial pressure in a high or ultrahigh vacuum space without any influence on the readings from the other gaseous components, the process being applicable also to determination of the oxygen partial pressure in outer space. Further, the measurement is to be capable of extension to the determination of oxygen partial pressures in gases and vapors with standard, elevated or negative pressure outside the measuring chamber.

This problem is solved, according to the invention, by measuring the oxygen partial pressure $p$ according to a relationship.

$$\ln p = f(I, T)$$

where the temperature $T$ of the emitter electrode is always so high that only oxygen is adsorbed, and $I$ is the current flowing in the circuit. The symbol $f$ means function.

In particular, with the constant current $I$, the temperature $T$ of the emitter electrode can be determined from the relationship between $T$ and the heating current $I_{HZ}$ of the emitter electrode:

$$T = f_1(I_{HZ})$$

For this purpose, an ammeter is arranged in the heating circuit of the emitter electrode.

The invention is based on the principle that above a temperature depending on the oxygen partial pressure, oxygen alone is adsorbed, and all other gases are not. Depending on the temperature $T$ of the metal surface, then, a certain surface coverage $\theta$ will be established, depending on the oxygen partial pressure:

$$\theta = f_2(T, p)$$

Owing to this coverage, the work function of the surface for electrons will change according to the relationship:

$$\varphi = f_3(\theta) = f_3(f_2(T, p)) = f_4(T, p)$$

For this reason, with the work function, the current $I$ changes according to Richardson's equation:

$$I = FA_0T^2 \exp\left(-\frac{1}{kT}\cdot\varphi\right) = FA_0T^2 \exp\left(-\frac{1}{kT}\cdot f_4(T, p)\right)$$

where $F$ = emitting surface area of emitter electrode in cm.$^2$
$A_0$ = Richardson's constant
$k$ = Boltzmann's constant This equation can be solved for $p$, so that for constant current $I$ the oxygen partial pressure $p$ is a function of the temperature $T$:

$$\ln p = f(T)_{I=\text{const.}}$$

The process is accordingly carried out by measuring the temperature change of the emitter electrode at constant current $I$.

Since the temperature of the emitter electrode is a function of its heating current $I_{HZ}$, $$T = f_5(I_{HZ})$$

it follows that $$\ln p = f_6(I_{HZ})_{I=\text{const.}}$$

Thus the oxygen partial pressure is determined from the heating current at constant current $I$. For this purpose, an otherwise known ionization pressure meter may be used, with an ammeter arranged in the heating circuit.

On the basis of the method of measurement outlined and the idea employed in devices for finding leaks, the oxygen partial pressure can be determined outside the measurement space by connecting the high-vacuum vessel to a standard, elevated or negative pressure chamber by way of a defined leak, and then determining the oxygen partial pressure in the latter. During the measurement, a constant working pressure is maintained in the high-vacuum vessel by means of a pump. In particular when a tungsten emitter is used, it is advisable to reduce the working pressure to less than $10^{-4}$ mm. Hg. The defined leak may be a proportioning valve through which the gas to be analyzed enters.

The drawings represent examples of practicing the process, as described below, and wherein FIG. 1 shows an arrangement for carrying out the process at constant current I.

Figure 1:
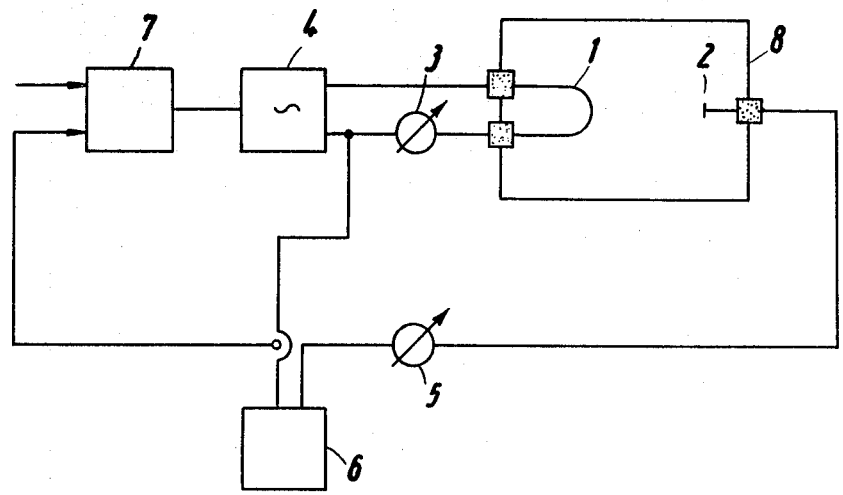

In the heating circuit of an emitter electrode 1 arranged facing a collector electrode 2, there is an ammeter 3. The heating current is supplied by a source of voltage 4. In the circuit of the collector and the emitter electrode, there are another ammeter 5 and another voltage source 6 whose positive pole is connected to the collector electrode. A control 7 keeps the current I at an adjustable value. The collector electrode and the emitter electrode are inside the chamber 8 of which the oxygen partial pressure is to be determined.

Figure 2:
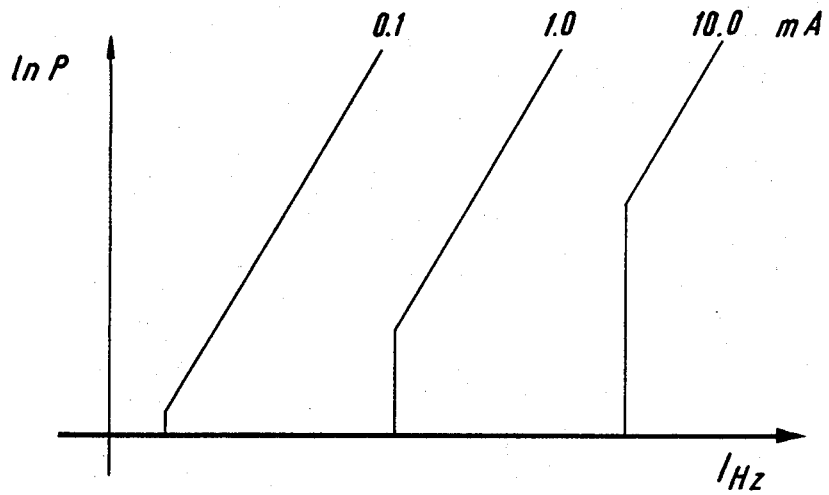
FIG. 2 shows a family of recorded curves with the current I as parameter.

The ammeter 5 serves to monitor the constancy of current. To calibrate the apparatus, different oxygen partial pressures are determined with a mass spectrograph and the corresponding values of the heating current $I_{HZ}$ recorded at constant current I. In this way, as in FIG. 2, a family of curves is obtained, with current I as parameter.

The process according to the invention is of especial advantage also in finding leaks in vacuum apparatus. The air entering at a leak always has a definite oxygen concentration, so that a definite oxygen partial pressure is established in the vacuum system.

If a stream of oxygen is directed at the leak, the oxygen partial pressure will rise. The leak is accordingly found by passing a nozzle from which oxygen is emerging, along the parts of the apparatus. Any leak will then be indicated by a very rapid rise of oxygen partial pressure.

Figure 3:
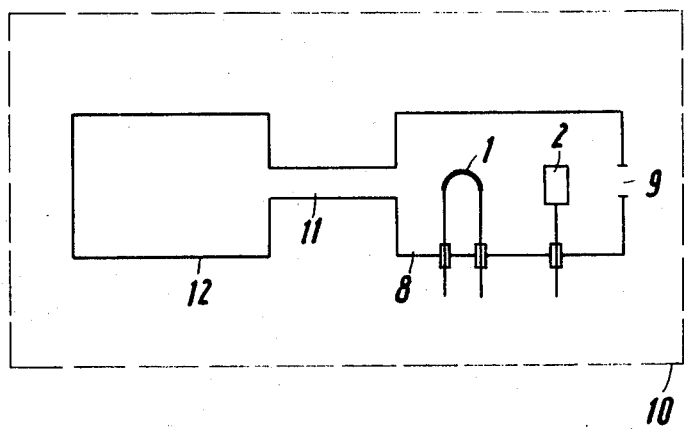
FIG. 3 shows an arrangement for determining the oxygen partial pressure outside the measuring chamber.

The arrangement illustrated in FIG. 3 serves to determine the oxygen partial pressure outside the chamber 8, or the high-vacuum vessel. By way of a defined leak 9, for example a valve with linear flow characteristic, the high-vacuum vessel or chamber 8 is connected with an outside space 10 containing the gas to be analyzed. Another connection 11 of known cross section leads to a pump 12.

By means of the pump 12, the pressure in the high-vacuum vessel is kept constant. The volume of gas withdrawn from the outside space 10 for this purpose is negligible relative to the total volume, so that conditions in the outside space 10 do not change. For known total outside pressure, the oxygen partial pressure in the outside space is readily determined from the measurement of that in the high vacuum 8.

In order to infer the oxygen partial pressure in an outside space 5 of small size from that prevailing in the high-vacuum vessel 1, the volume of gas withdrawn from the outside space 5 must be known. The volume supplied to the high vacuum in a certain unit of time is proportional to the aperture of the proportioning valve; the volume flowing out is proportional to the pressure difference set up by the pump between the pressures in the pump line and in the high vacuum. The volume change that has occurred in the same unit of time in the high vacuum is found from the difference between inflow and outflow, and is proportional to the pressure change in the high vacuum. By preparatory measurements and/or calculations, the throughflow will thus be determined, so that in this case also the oxygen partial pressure can be determined by measurement at constant working pressure.

The advantage of the process according to the invention resides in its simplicity of procedure and above all in that any known type of ionization vacuum meter may be used, with an ammeter arranged in its heating circuit. Then a single calibration, in the manner described, will suffice.

Such ionization pressure meters may also be used in space vehicles to measure the oxygen partial pressure in outer space.

What is claimed:
1. A process for measuring the oxygen partial pressure of a high vacuum space utilizing a heated emitter and a collector which comprises:
 (1) establishing a calibration curve by the steps of:
  (a) heating an emitter to a temperature high enough so that only oxygen is adsorbed thereon,
  (b) measuring values for a calibration curve of emitter heating current versus oxygen partial pressure at fixed emitter-collector current by establishing a known oxygen partial pressure in the space and measuring the heating current necessary to create a fixed emitter-collector current,
  (c) plotting the values obtained in "b" to generate a calibration curve and;
 (2) Measuring the oxygen partial pressure of the test space by the steps of:
  (a) heating the emitter to the high temperature so that only oxygen is adsorbed thereon,
  (b) adjusting the emitter heating current until the emitter-collector current of the calibration curve is obtained and
  (c) determining from the calibration curve the oxygen partial pressure.
2. A process according ot claim 1 wherein the oxygen partial pressure of a region is determined by passing gas of the region through a defined leak into high vacuum space.
3. A process according to claim 1 wherein the emitter is tungsten.
4. A process according to claim 1 wherein the high vacuum space is less than $10^{-4}$ mm. Hg.

References Cited

UNITED STATES PATENTS

| | | | |
|---|---|---|---|
| 2,537,775 | 1/1951 | MacNeille | 324—33 |
| 2,972,716 | 2/1961 | Morgan | 324—33 |
| 3,411,073 | 11/1968 | Marv | 324—33 |

OTHER REFERENCES

Nelson: "An AC Operated Leak Detector and Ionization Gage" March 1945, The Review of Scientific Instruments, vol. 16, No. 3, pp. 55–57.

RICHARD C. QUEISSER, Primary Examiner
E. J. KOCH, Assistant Examiner

U.S. Cl. X.R.
324—32